US012807539B2

(12) United States Patent
Lv

(10) Patent No.: US 12,807,539 B2
(45) Date of Patent: Nov. 24, 2026

(54) MANGANESE ZINC FERRITE, PREPARATION METHOD THEREFOR AND USE THEREOF

(71) Applicant: HENGDIAN GROUP DMEGC MAGNETICS CO., LTD, Dongyang City (CN)

(72) Inventor: Donghua Lv, Dongyang City (CN)

(73) Assignee: HENGDIAN GROUP DMEGC MAGNETICS CO., LTD, Dongyang City (CN)

( * ) Notice: Subject to any disclaimer, the term of this patent is extended or adjusted under 35 U.S.C. 154(b) by 604 days.

(21) Appl. No.: 18/546,960

(22) PCT Filed: Apr. 21, 2021

(86) PCT No.: PCT/CN2021/088703

§ 371 (c)(1),
(2) Date: Aug. 17, 2023

(87) PCT Pub. No.: WO2022/205537

PCT Pub. Date: Oct. 6, 2022

(65) Prior Publication Data

US 2024/0051880 A1 Feb. 15, 2024

(30) Foreign Application Priority Data

Mar. 30, 2021 (CN) ........................ 202110343235.0

(51) Int. Cl.

| | |
|---|---|
| ***C04B 35/64*** | (2006.01) |
| ***C04B 35/26*** | (2006.01) |
| ***C04B 35/626*** | (2006.01) |
| ***H01F 1/34*** | (2006.01) |

(52) U.S. Cl.

CPC .......... *C04B 35/64* (2013.01); *C04B 35/2658* (2013.01); *C04B 35/6261* (2013.01); *C04B 35/62695* (2013.01); *H01F 1/344* (2013.01); *C04B 2235/3208* (2013.01); *C04B 2235/3244* (2013.01); *C04B 2235/3262* (2013.01); *C04B 2235/3272* (2013.01); *C04B 2235/3275* (2013.01); *C04B 2235/3284* (2013.01); *C04B 2235/96* (2013.01)

(58) Field of Classification Search

CPC ... H01F 1/344; C04B 35/64; C04B 35/62695; C04B 35/6261; C04B 35/6262; C04B 35/6258; C04B 2235/96; C04B 2235/3208; C04B 2235/3244; C04B 2235/3262; C04B 2235/3275; C04B 2235/3284; C04B 2235/3272

See application file for complete search history.

(56) References Cited

U.S. PATENT DOCUMENTS

2009/0242827 A1* 10/2009 Nakahata ............ C04B 35/2658
252/62.62
2011/0012702 A1 1/2011 Yoshida et al.

FOREIGN PATENT DOCUMENTS

| | | | |
|---|---|---|---|
| CN | 1686931 | | 10/2005 |
| CN | 101090017 | * | 12/2007 |
| CN | 102390986 | | 3/2012 |
| CN | 102486957 | * | 6/2012 |
| CN | 102693803 | * | 9/2012 |
| CN | 102964117 | * | 3/2013 |
| CN | 103588472 | | 2/2014 |
| CN | 103964831 | | 8/2014 |
| CN | 104591711 | | 5/2015 |
| CN | 106396661 | | 2/2017 |
| CN | 108275992 | | 7/2018 |
| CN | 108821760 | * | 11/2018 |
| CN | 110078488 | | 8/2019 |
| CN | 110436911 | | 11/2019 |
| CN | 110540431 | | 12/2019 |
| CN | 111116190 | | 5/2020 |
| CN | 111362685 | | 7/2020 |
| CN | 112408969 | | 2/2021 |
| JP | 2005330126 | | 12/2005 |

OTHER PUBLICATIONS

Translation for CN 101090017, Dec. 19, 2007.*
Translation for CN 102964117, Mar. 13, 2013.*
Translation for CN 108821760, Nov. 16, 2018.*
International Search Report dated Dec. 30, 2021 from corresponding PCT Application No. PCT/CN2021/088703.
Office Action dated Sep. 18, 2021 from corresponding CN Application No. 202110343235.0.

* cited by examiner

*Primary Examiner* — C Melissa Koslow
(74) *Attorney, Agent, or Firm* — ArentFox Schiff LLP

(57) ABSTRACT

Disclosed are a manganese zinc ferrite, a preparation method therefor and the use thereof. The manganese zinc ferrite comprises main components and auxiliary components, wherein the main components comprise iron oxide, zinc oxide and manganese monoxide; and according to the total amount of 100 mol % of the main components, the content of ferric oxide is 52.75-53.15 mol %, the content of zinc oxide is 9.1-10.7 mol %, and the balance being manganese monoxide.

6 Claims, No Drawings

MANGANESE ZINC FERRITE, PREPARATION METHOD THEREFOR AND USE THEREOF

CROSS REFERENCE TO RELATED APPLICATION(S)

This application is a National Phase entry of PCT Application No. PCT/CN2021/088703, entitled "MANGANESE ZINC FERRITE, PREPARATION METHOD THEREFOR AND USE THEREOF" and filed on Apr. 21, 2021, which claims priority of Chinese Application No. 202110343235.0 entitled "MANGANESE ZINC FERRITE, PREPARATION METHOD THEREFOR AND USE THEREOF" and filed on Mar. 30, 2021, both of which are expressly incorporated by reference herein in their entirety.

TECHNICAL FIELD

The present application belongs to the technical field of ferrite preparation, and relates to a manganese zinc ferrite, a preparation method therefor and use thereof.

BACKGROUND

In the field of Mn—Zn power ferrite, although some new improvements have been realized with the emerging of some new requirements of electronic components, such as reducing the loss, improving the Bs of the material, achieving a low loss over a wide temperature range, etc., these improved characteristics are still unsatisfactory, and especially the loss is high, the Bs is only 410-420 mT at 100 °C, the manufacturing costs are high sometimes, and NiO is required, etc. Examples can be found in patents CN110436911A, CN110540431A, CN110078488A and CN103964831B, etc.

In the prior art, the low loss over a wide temperature range is mainly realized by adding $Co_2O_3$ and $SnO_2$ or $TiO_2$. As for the loss reduction, it is mainly achieved by adding substances with high resistivity such as $CaCO_3$, $SiO_2$ and $Nb_2O_5$. In the sintering process, it is mainly achieved by balancing the oxygen partial pressure in the cooling section.

CN110436911A discloses a soft magnetic material, which includes the following content of the main component: 54-58 mol % of $Fe_2O_3$, 30-35 mol % of MnO, and a remainder of ZnO; based on a total weight of the main component, the following content of the auxiliary component: 0.02-0.04 wt % of $CaCO_3$, 0.02-0.1 wt % of $TiO_2$, 0.02-0.05 wt % of $Nb_2O_5$, 0-0.02 wt % of $ZrO_2$, 0.01-0.1 wt % of $V_2O_5$, 0.01-0.04 wt % of $SnO_2$, 0.3-0.4 wt % of $Co_2O_3$, and 0-0.1 wt % of NiO.

CN110078488A discloses a soft magnetic ferrite material with high Bs and low loss over a wide temperature range and a preparation method therefor. The ferrite material includes a main component, a first auxiliary component, and a second auxiliary component, wherein the main component includes $Fe_2O_3$ with a content of 53.4-54.5 mol %, ZnO with a content of 7.5-9.4 mol %, NiO with a content of 0.3-0.8 mol %, and a remainder of MnO; the first auxiliary component includes $CaCO_3$, $SiO_2$, and $Co_2O_3$, and the second auxiliary component includes at least one of $Nb_2O_5$, $ZrO_2$, $Ta_2O_5$, $V_2O_5$, $CeO_2$ and $HfO_2$, or one or both of $TiO_2$ and $SnO_2$ are used.

CN103964831A discloses a Mn—Zn ferrite material with low loss over a wide temperature range and a preparation method therefor. The material is consisted of a main component and an auxiliary component. The main component and its content include, by oxide: 52.4-54.3 mol % of $Fe_2O_3$, 2-13 mol % of ZnO and a remainder of MnO; based on a total weight of the main component, the auxiliary component is: 100-250 ppm of $SiO_2$, 150-1500 ppm of $CaCO_3$, 50-500 ppm of $Nb_2O_5$, 200-1500 ppm of $TiO_2$, 200-5000 ppm of $SnO_2$ and 3000-5000 ppm of $Co_2O_3$.

For the existing phone charger or laptop power supply, in order to meet the requirements of fast charging, the magnetic core is required to have a lower loss at 25-100 °C and a higher saturation magnetic flux density at 100 °C. In order to meet this requirement, the existing ferrite formula and preparation process need to be improved.

SUMMARY

The present application is to provide a manganese zinc ferrite, a preparation method therefor and use thereof; by improving the contents of the formula components, the manganese zinc ferrite is given a low loss over a wide temperature range, and the saturation magnetic flux density of the manganese zinc ferrite is increased.

To achieve the object, the present application adopts the technical solutions below.

In a first aspect, the present application provides a manganese zinc ferrite; the manganese zinc ferrite includes a main component and an auxiliary component, and the main component includes iron oxide, zinc oxide and manganese monoxide; based on a total amount of the main component being 100 mol %, a content of iron oxide is 52.75-53.15 mol %, such as 52.75 mol %, 52.8 mol %, 52.85 mol %, 52.9 mol %, 52.95 mol %, 53 mol %, 53.05 mol %, 53.1 mol % or 53.15 mol %, and a content of zinc oxide is 9.1-10.7 mol %, such as 9.1 mol %, 9.2 mol %, 9.3 mol %, 9.4 mol %, 9.5 mol %, 9.6 mol %, 9.7 mol %, 9.8 mol %, 9.9 mol %, 10.0 mol %, 10.1 mol %, 10.2 mol %, 10.3 mol %, 10.4 mol %, 10.5 mol %, 10.6 mol %, or 10.7 mol %, and a remainder is manganese monoxide.

The present application provides a manganese zinc ferrite, and by improving the contents of the formula components, the manganese zinc ferrite is given a low loss over a wide temperature range, and the saturation magnetic flux density (referred to as Bs hereinafter) of the manganese zinc ferrite is increased. Specifically, the present application limits the content of iron oxide in the main component to 52.75-53.15 mol %, and the $Fe_2O_3$ content in the main formula directly affects the magnetocrystalline anisotropy constant $K_1$ and resistivity of the material. When the content of $Fe_2O_3$ is higher than 53.15 mol %, the resistivity of manganese zinc ferrite will be reduced, the eddy current loss of the material will be increased, and meanwhile, the valley point will shift towards the negative temperature direction, which is not conducive to reducing the loss of manganese zinc ferrite at 25-80 °C; when the content of $Fe_2O_3$ is lower than 52.75 mol %, the negative magnetocrystalline anisotropy constant $K_1$ cannot be effectively cancelled out, which is not conducive to reducing the hysteresis loss; therefore, the $Fe_2O_3$ content should be strictly controlled in the range of 52.75-53.15 mol %.

Additionally, it should be noted that, based on the conventional theory, the zinc ferrite generated from ZnO has no magnetic property, no magnetocrystalline anisotropy constant $K_1$, and no effect on the wide-temperature characteristics. However, from the view of the present application, although the zinc ferrite generated from ZnO has no magnetic property, i.e., no magnetocrystalline anisotropy constant $K_1$, ZnO influences the content of $Fe_2O_3$ and MnO and thus influences the amount of the main phase manganese ferrite generated, which indirectly affects the magnetocrystalline anisotropy constant $K_1$ of the material; therefore, it is indicated by the present application that ZnO has some effects on the wide-temperature characteristics, so that the content of zinc oxide is also particularly limited.

As an optional technical solution of the present application, the auxiliary component includes cobalt oxide.

Optionally, the auxiliary component further includes calcium carbonate and zirconium oxide.

In the present application, the manganese zinc ferrite is given a low loss over a wide temperature range by the addition of the auxiliary component. Because the $Fe_2O_3$ content is not sufficient to control the magnetocrystalline anisotropy constant $K_1$ of the material, and the negative $K_1$ cannot be further reduced (the $K_1$ of iron ferrite generated from $Fe_2O_3$ is positive). Therefore, an auxiliary component is required to further cancel out the negative $K_1$ value. The optional auxiliary component added in the present application is cobalt oxide. In a case where the main component is certain, cobalt oxide can be appropriately added to generate cobalt ferrite to achieve the wide-temperature characteristics, and meanwhile, some high resistivity materials can be added to reduce the eddy current loss of the manganese zinc ferrite.

It should be noted that the wide-temperature characteristics are conventionally achieved by using $Co_2O_3$ and $SnO_2$ or $TiO_2$. However, the present application uses the combined effects of $Fe_2O_3$, ZnO and $Co_2O_3$ as well as the sintering process with proper oxidation to achieve the low loss over a wide temperature range of the material.

As an optional technical solution of the present application, under test conditions at a test frequency of 100 kHz and a magnetic flux density of 200 mT, the manganese zinc ferrite has a loss of less than 230 kW/m$^3$ in a 25 °C environment.

Optionally, under test conditions at a test frequency of 100 kHz and a magnetic flux density of 200 mT, the manganese zinc ferrite has a loss of less than 230 kW/m$^3$ in a 60 °C. environment.

Optionally, under test conditions at a test frequency of 100 kHz and a magnetic flux density of 200 mT, the manganese zinc ferrite has a loss of less than 250 kW/m$^3$ in an 80 °C environment.

Optionally, under test conditions at a test frequency of 100 kHz and a magnetic flux density of 200 mT, the manganese zinc ferrite has a loss of less than 290 kW/m$^3$ at 100 °C.

Optionally, under test conditions at a test frequency of 50 Hz and a magnetic field intensity of 1194 A/m, the ferrite has a saturation magnetic flux density of more than 430 mT in a 100 °C environment.

In a second aspect, the present application provides a preparation method for the manganese zinc ferrite according to the first aspect, and the preparation method includes:

mixing iron oxide, zinc oxide and manganese monoxide at a ratio and then performing primary wet grinding, pre-sintering the obtained wet material to obtain a pre-sintered material, adding an auxiliary component into the pre-sintered material and then performing secondary wet grinding, performing compression molding and sintering to obtain the manganese zinc ferrite.

One point of the present application is to combine the composition formula and sintering process for improving the low loss over a wide temperature range and increasing the Bs of the material. In terms of the sintering process, the present application does not adopt the traditional balanced oxygen partial pressure cooling mode but adopts a cooling mode with proper oxidation to control the amount of iron ferrite in the material; the negative $K_1$ value is cancelled out, and the resistivity of the material is also improved to a certain extent; meanwhile, it is also required to generate a certain amount of cobalt ferrite, reducing the impact of large cobalt ferrite $K_2$ value; the generated iron ferrite and cobalt ferrite work together, so that the loss changes with the temperature more smoothly.

As an optional technical solution of the present application, the preparation method specifically includes the following steps:

a. mixing iron oxide, zinc oxide and manganese monoxide at a ratio to obtain a main component, mixing the main component with water and then performing primary wet grinding, adding a binder into the obtained wet main component and then performing granulation and pre-sintering sequentially to obtain a pre-sintered material; and b. mixing the pre-sintered material with an auxiliary component to obtain an intermediate mixture, mixing the intermediate mixture with water and performing secondary wet grinding, adding a binder into the obtained wet intermediate mixture and then performing granulation, molding and sintering sequentially to obtain the manganese zinc ferrite.

As an optional technical solution of the present application, in step (I), based on a total amount of the main component being 100 mol %, a content of iron oxide is 52.75-53.15 mol %, such as 52.75 mol %, 52.8 mol %, 52.85 mol %, 52.9 mol %, 52.95 mol %, 53 mol %, 53.05 mol %, 53.1 mol % or 53.15 mol %, and a content of zinc oxide is 9.1-10.7 mol %, such as 9.1 mol %, 9.2 mol %, 9.3 mol %, 9.4 mol %, 9.5 mol %, 9.6 mol %, 9.7 mol %, 9.8 mol %, 9.9 mol %, 10.0 mol %, 10.1 mol %, 10.2 mol %, 10.3 mol %, 10.4 mol %, 10.5 mol %, 10.6 mol % or 10.7 mol %, and a remainder is manganese monoxide.

Optionally, the primary wet grinding is ball milling.

Optionally, during the primary wet grinding, the main component, balls and water have a mass ratio of 1:(5-8):(0.4-0.6), such as 1:5:0.4, 1:5:0.5, 1:5:0.6, 1:6:0.4, 1:6:0.5, 1:6:0.6, 1:7:0.4, 1:7:0.5, 1:7:0.6, 1:8:0.4, 1:8:0.5 or 1:8:0.6; however, the mass ratio is not limited to the listed values, and other unlisted values within this numeric range are also applicable.

Optionally, a mass of the binder added into the wet main component is 8-10 wt % of a total mass of the wet main component, such as 8.0 wt %, 8.2 wt %, 8.4 wt %, 8.6 wt %, 8.8 wt %, 9.0 wt %, 9.2 wt %, 9.4 wt %, 9.6 wt %, 9.8 wt % or 10.0 wt %; however, the mass fraction is not limited to the listed values, and other unlisted values within this numeric range are also applicable.

Optionally, the binder has a mass fraction of 7.5-10 wt %, such as 7.5 wt %, 8 wt %, 8.5 wt %, 9 wt %, 9.5 wt % or 10 wt %; however, the mass fraction is not limited to the listed values, and other unlisted values within this numeric range are also applicable.

As an optional technical solution of the present application, in step (I), the granulation is spray granulation;

Optionally, during the spray granulation, a material inlet temperature is 320-350 °C, such as 320 °C, 322 °C, 324 °C, 326 °C, 328 °C, 330 °C, 332 °C, 334 °C, 336 °C, 338 °C, 340 °C, 342 °C, 344 °C, 346 °C, 348 °C or 350 °C; however, the material inlet temperature is not limited to the listed values, and other unlisted values within this numeric range are also applicable.

Optionally, during the spray granulation, a material outlet temperature is 85-100 °C, such as 85 °C, 86 °C, 87 °C, 88 °C, 89 °C, 90 °C, 91 °C, 92 °C, 93 °C., 94 °C, 95 °C, 96 °C, 97 °C, 98 °C, 99 °C or 100 °C; however, the material outlet temperature is not limited to the listed values, and other unlisted values within this numeric range are also applicable.

Optionally, the pre-sintering is performed in a rotary kiln.

Optionally, the pre-sintering is performed at 850-950 °C, such as 850 °C, 860 °C, 870 °C, 880 °C, 890 °C, 900 °C, 910 °C, 920 °C, 930 °C, 940 °C or 950 °C; however, the temperature is not limited to the listed values, and other unlisted values within this numeric range are also applicable.

Optionally, the pre-sintering is performed for 3-6 h, such as 3.0 h, 3.2 h, 3.4 h, 3.6 h, 3.8 h, 4.0 h, 4.2 h, 4.4 h, 4.6 h, 4.8 h, 5.0 h, 5.2 h, 5.4 h, 5.6 h, 5.8 h or 6.0 h; however, the time is not limited to the listed values, and other unlisted values within this numeric range are also applicable.

As an optional technical solution of the present application, in step (II), the auxiliary component includes cobalt oxide.

Optionally, the auxiliary component is calcium carbonate, zirconium oxide and cobalt oxide.

Optionally, a content of calcium carbonate added into the pre-sintered material is 0.06-0.08 wt % of a total mass of the pre-sintered material, such as 0.06 wt %, 0.062 wt %, 0.064 wt %, 0.068 wt %, 0.07 wt %, 0.072 wt %, 0.074 wt %, 0.076 wt %, 0.078 wt % or 0.08 wt %; however, the content ratio is not limited to the listed values, and other unlisted values within this numeric range are also applicable.

Optionally, a content of zirconium oxide added into the pre-sintered material is 0.02-0.04 wt % of a total mass of the pre-sintered material, such as 0.02 wt %, 0.022 wt %, 0.024 wt %, 0.026 wt %, 0.028 wt %, 0.03 wt %, 0.032 wt %, 0.034 wt %, 0.036 wt %, 0.038 wt % or 0.04 wt %; however, the content ratio is not limited to the listed values, and other unlisted values within this numeric range are also applicable.

Optionally, a content of cobalt oxide added into the pre-sintered material is 0.35-0.39 wt % of a total mass of the pre-sintered material, such as 0.35 wt %, 0.355 wt %, 0.36 wt %, 0.365 wt %, 0.37 wt %, 0.375 wt %, 0.38 wt %, 0.385 wt % or 0.39 wt %; however, the content ratio is not limited to the listed values, and other unlisted values within this numeric range are also applicable.

Optionally, the secondary wet grinding is ball milling.

Optionally, during the secondary wet grinding, the intermediate mixture, balls and water have a mass ratio of 1:(5-8):(0.4-0.6), such as 1:5:0.4, 1:5:0.5, 1:5:0.6, 1:6:0.4, 1:6:0.5, 1:6:0.6, 1:7:0.4, 1:7:0.5, 1:7:0.6, 1:8:0.4, 1:8:0.5 or 1:8:0.6; however, the mass ratio is not limited to the listed values, and other unlisted values within this numeric range are also applicable.

Optionally, a mass of the binder added into the wet intermediate mixture is 8-10 wt % of a total mass of the wet intermediate mixture, such as 8.0 wt %, 8.2 wt %, 8.4 wt %, 8.6 wt %, 8.8 wt %, 9.0 wt %, 9.2 wt %, 9.4 wt %, 9.6 wt %, 9.8 wt % or 10.0 wt %; however, the mass ratio is not limited to the listed values, and other unlisted values within this numeric range are also applicable.

Optionally, the binder has a mass fraction of 7.5-10 wt %, such as 7.5 wt %, 8 wt %, 8.5 wt %, 9 wt %, 9.5 wt % or 10 wt %; however, the mass fraction is not limited to the listed values, and other unlisted values within this numeric range are also applicable.

As an optional technical solution of the present application, in step (II), the granulation is spray granulation.

Optionally, during the spray granulation, a material inlet temperature is 320-350 °C, such as 320 °C, 322 °C, 324 °C, 326 ° C, 328 °C, 330 °C, 332 °C, 334 °C, 336 °C, 338 °C, 340 °C, 342 °C, 344 °C, 346 °C, 348 °C or 350 °C; however, the material inlet temperature is not limited to the listed values, and other unlisted values within this numeric range are also applicable.

Optionally, during the spray granulation, a material outlet temperature is 85-100 °C, such as 85 °C, 86 °C, 87 °C, 88 °C, 89 °C, 90 °C, 91 °C, 92 °C, 93 °C, 94 °C, 95 °C, 96 °C, 97 °C, 98 °C, 99 °C or 100 °C; however, the material outlet temperature is not limited to the listed values, and other unlisted values within this numeric range are also applicable.

Optionally, the molding includes performing compression at 5-10 MPa to prepare a standard ring, such as 5.0 MPa, 5.5 MPa, 6.0 MPa, 6.5 MPa, 7.0 MPa, 7.5 MPa, 8.0 MPa, 8.5 MPa, 9.0 MPa, 9.5 MPa or 10.0 MPa; however, the pressure is not limited to the listed values, and other unlisted values within this numeric range are also applicable.

Optionally, the sintering is performed in a bell jar furnace.

Optionally, the sintering includes a sintering section and a cooling section which are performed sequentially.

Optionally, the sintering section is performed at 1290-1320 °C, such as 1290 °C, 1292 °C, 1294 °C, 1296 °C, 1298 °C, 1300 °C, 1302 °C, 1304 °C., 1306 °C, 1308 °C, 1310 °C, 1312 °C, 1314 °C, 1316 °C, 1318 °C or 1320 °C; however, the temperature is not limited to the listed values, and other unlisted values within this numeric range are also applicable.

Optionally, the sintering section has a holding time of 3-6 h, such as 3.0 h, 3.2 h, 3.4 h, 3.6 h, 3.8 h, 4.0 h, 4.2 h, 4.4 h, 4.6 h, 4.8 h, 5.0 h, 5.2 h, 5.4 h, 5.6 h, 5.8 h or 6.0 h; however, the time is not limited to the listed values, and other unlisted values within this numeric range are also applicable.

Optionally, the sintering section has an oxygen content of 3-6%, such as 3.0%, 3.2%, 3.4%, 3.6%, 3.8%, 4.0%, 4.2%, 4.4%, 4.6%, 4.8%, 5.0%, 5.2%, 5.4%, 5.6%, 5.8% or 6.0%; however, the oxygen content is not limited to the listed values, and other unlisted values within this numeric range are also applicable.

Optionally, the cooling section is divided into an earlier cooling section and a later cooling section which are performed sequentially, and the later cooling section includes a first cooling section and a second cooling section which are performed sequentially.

Optionally, the earlier cooling section includes cooling from an end temperature of the sintering section to an initial temperature of the first cooling section.

Optionally, the first cooling section is cooling from 450 °C to 280 °C.

Optionally, the second cooling section is cooling from 280 °C to 50 °C.

Optionally, the first cooling section has an oxygen content of 0.02-0.15%, such as 0.02%, 0.03%, 0.04%, 0.05%, 0.06%, 0.07%, 0.08%, 0.09%, 0.1%, 0.11%, 0.12%, 0.13%, 0.14% or 0.15%; however, the oxygen content is not limited to the listed values, and other unlisted values within this numeric range are also applicable.

Optionally, the second cooling section has an oxygen content of 0%.

Optionally, the later cooling section has a cooling rate of 0.05-0.3 °C/min, such as 0.05 °C/min, 0.1 °C/min, 0.15 °C/min, 0.2 °C/min, 0.25 °C/min or 0.3 °C/min; however, the cooling rate is not limited to the listed values, and other unlisted values within this numeric range are also applicable.

The present application adopts proper oxidation in the cooling section to complete the sintering process; the proper oxidation, on the one hand, is to improve the resistivity of the material, and on the other hand, to control the amount of iron ferrite in the material; the negative $K_1$ value is cancelled out; meanwhile, it is also required to generate a certain amount of cobalt ferrite, reducing the impact of large cobalt ferrite $K_2$ value; the generated iron ferrite and cobalt ferrite work together, so that the loss changes with the temperature more smoothly. The cooling rate of 0.05-0.3 °C/min is also conducive to reducing the internal stress of the material and further reducing the hysteresis loss.

In a third aspect, the present application provides use of the manganese zinc ferrite according to the first aspect, and the manganese zinc ferrite is used in a power adapter.

Compared with the prior art, the present application has the beneficial effects below.

The present application provides a manganese zinc ferrite, and by improving the contents of the formula components, the manganese zinc ferrite is given a low loss over a wide temperature range, and the saturation magnetic flux density of the manganese zinc ferrite is increased. Under test conditions at a test frequency of 100 kHz and a magnetic flux density of 200 mT, the manganese zinc ferrite has a loss of less than 230 kW/m$^3$ in a 25 °C environment; under test conditions at a test frequency of 100 kHz and a magnetic flux density of 200 mT, the manganese zinc ferrite has a loss of less than 230 kW/m$^3$ in a 60 °C environment; under test conditions at a test frequency of 100 kHz and a magnetic flux density of 200 mT, the manganese zinc ferrite has a loss of less than 250 kW/m$^3$ in an 80 °C environment; under test conditions at a test frequency of 100 kHz and a magnetic flux density of 200 mT, the manganese zinc ferrite has a loss of less than 290 kW/m$^3$ at 100 °C; under test conditions at a test frequency of 50 Hz and a magnetic field intensity of 1194 A/m, the ferrite has a saturation magnetic flux density of more than 430 mT in a 100 °C environment.

DETAILED DESCRIPTION

The technical solutions of the present application are further described below through specific embodiments.

Example 1

This example provides a preparation method for a manganese zinc ferrite, and the preparation method specifically includes the following steps:

i. the 52.75 mol % of $Fe_2O_3$, 38.15 mol % of MnO and 9.1 mol % of ZnO were mixed to obtain a main component, and the main component was mixed with water and subjected to primary wet grinding for 0.5 h, and the main component, balls and water had a mass ratio of 1:5:0.4;

ii. the obtained wet main component was added with a binder (a mass fraction of the binder was 7.5 wt %) and then subjected to spray granulation and pre-sintering sequentially to obtain a pre-sintered material, and a mass of the binder added was 8 wt % of a total mass of the wet main component; during the spray granulation, a material inlet temperature was 320 °C, and a material outlet temperature was 85 °C; the pre-sintering was performed at 850 °C for 3 h in a rotary kiln;

iii. the pre-sintered material was added with calcium carbonate, zirconium oxide and cobalt oxide, wherein an addition amount of calcium carbonate was 0.06 wt % of a total mass of the pre-sintered material, an addition amount of zirconium oxide was 0.02 wt % of a total mass of the pre-sintered material, and an addition amount of cobalt oxide was 0.35 wt % of a total mass of the pre-sintered material, the materials were mixed uniformly to obtain an intermediate mixture, the intermediate mixture was mixed with water and subjected to secondary wet grinding for 1.5 h to obtain the wet intermediate mixture, and the intermediate mixture, balls and water had a mass ratio of 1:5:0.4; and iv. the wet intermediate mixture was added with a binder (a mass fraction of the binder was 7.5 wt %) and then subjected to spray granulation, molding and sintering sequentially to obtain the manganese zinc ferrite, and a mass of the binder added in the wet intermediate mixture was 8 wt % of a total mass of the wet intermediate mixture; during the spray granulation, a material inlet temperature was 320 °C, and a material outlet temperature was 85 °C; compression was performed at 5 MPa to prepare a standard ring; the sintering was performed in a bell jar furnace, the sintering included a sintering section and a cooling section which were performed sequentially, the sintering section was performed at 1290 °C, the sintering section had a holding time of 3 h, the sintering section had an oxygen content of 3%, the cooling section was divided into an earlier cooling section and a later cooling section which were performed sequentially, the earlier cooling section was cooling from 1290 °C to 450 °C, the later cooling section included a first cooling section and a second cooling section which were performed sequentially, the first cooling section was cooling from 450 °C to 280 °C, the first cooling section had an oxygen content of 0.08%, the second cooling section was cooling from 280 °C to 50 °C, the second cooling section had an oxygen content of 0%, and the first cooling section and the second cooling section both had a cooling rate of 0.05 °C/min.

Example 2

This example provides a preparation method for a manganese zinc ferrite, and the preparation method specifically includes the following steps:

i. the 52.8 mol % of $Fe_2O_3$, 37.9 mol % of MnO and 9.3 mol % of ZnO were mixed to obtain a main component, and the main component was mixed with water and subjected to primary wet grinding for 0.5 h, and the main component, balls and water had a mass ratio of 1:5:0.5;

ii. the obtained wet main component was added with a binder (a mass fraction of the binder was 8 wt %) and then subjected to spray granulation and pre-sintering sequentially to obtain a pre-sintered material, and a mass of the binder added was 8.4 wt % of a total mass of the wet main component; during the spray granulation, a material inlet temperature was 326 °C, and a material outlet temperature was 88 °C; the pre-sintering was performed at 870 °C for 3.6 h in a rotary kiln;

iii. the pre-sintered material was added with calcium carbonate, zirconium oxide and cobalt oxide, wherein an addition amount of calcium carbonate was 0.065 wt % of a total mass of the pre-sintered material, an addition amount of zirconium oxide was 0.024 wt % of a total mass of the pre-sintered material, and an addition amount of cobalt oxide was 0.358 wt % of a total mass of the pre-sintered material, the materials were mixed uniformly to obtain an intermediate mixture, the intermediate mixture was mixed with water and subjected to secondary wet grinding for 1.5 h to obtain the wet intermediate mixture, and the intermediate mixture, balls and water had a mass ratio of 1:5:0.5; and iv. the wet intermediate mixture was added with a binder (a mass fraction of the binder was 8 wt %) and then subjected to spray granulation, molding and sintering sequentially to obtain the manganese zinc ferrite, and a mass of the binder added in the wet intermediate mixture was 8.4 wt % of a total mass of the wet intermediate mixture; during the spray granulation, a material inlet temperature was 326 °C, and a material outlet temperature was 88 °C; compression was performed at 6 MPa to prepare a standard ring; the sintering was performed in a bell jar furnace, the sintering included a sintering section and a cooling section which were performed sequentially, the sintering section was performed at 1296 °C, the sintering section had a holding time of 3.6 h, the sintering section had an oxygen content of 3.6%, the cooling section was divided into an earlier cooling section and a later cooling section which were performed sequentially, the earlier cooling section was cooling from 1296 °C to 450 °C, the later cooling section included a first cooling section and a second cooling section which were performed sequentially, the first cooling section was cooling from 450 °C to 280 °C, the first cooling section had an oxygen content of 0.1%, the second cooling section was cooling from 280 °C to 50 °C, the second cooling section had an oxygen content of 0%, and the first cooling section and the second cooling section both had a cooling rate of 0.1 °C/min.

Example 3

This example provides a preparation method for a manganese zinc ferrite, and the preparation method specifically includes the following steps:

i. the 52.9 mol % of $Fe_2O_3$, 37.6 mol % of MnO and 9.5 mol % of ZnO were mixed to obtain a main component, and the main component was mixed with water and subjected to primary wet grinding for 0.5 h, and the main component, balls and water had a mass ratio of 1:6:0.5;

ii. the obtained wet main component was added with a binder (a mass fraction of the binder was 8.5 wt %) and then subjected to spray granulation and pre-sintering sequentially to obtain a pre-sintered material, and a mass of the binder added was 8.8 wt % of a total mass of the wet main component; during the spray granulation, a material inlet temperature was 332 °C, and a material outlet temperature was 91 °C; the pre-sintering was performed at 890 °C for 4.2 h in a rotary kiln;

iii. the pre-sintered material was added with calcium carbonate, zirconium oxide and cobalt oxide, wherein an addition amount of calcium carbonate was 0.07 wt % of a total mass of the pre-sintered material, an addition amount of zirconium oxide was 0.028 wt % of a total mass of the pre-sintered material, and an addition amount of cobalt oxide was 0.366 wt % of a total mass of the pre-sintered material, the materials were mixed uniformly to obtain an intermediate mixture, the intermediate mixture was mixed with water and subjected to secondary wet grinding for 1.5 h to obtain the wet intermediate mixture, and the intermediate mixture, balls and water had a mass ratio of 1:6:0.5; and iv. the wet intermediate mixture was added with a binder (a mass fraction of the binder was 8.5 wt %) and then subjected to spray granulation, molding and sintering sequentially to obtain the manganese zinc ferrite, and a mass of the binder added in the wet intermediate mixture was 8.8 wt % of a total mass of the wet intermediate mixture; during the spray granulation, a material inlet temperature was 332 °C, and a material outlet temperature was 91 °C; compression was performed at 7 MPa to prepare a standard ring; the sintering was performed in a bell jar furnace, the sintering included a sintering section and a cooling section which were performed sequentially, the sintering section was performed at 1300 °C, the sintering section had a holding time of 4.2 h, the sintering section had an oxygen content of 4.2%, the cooling section was divided into an earlier cooling section and a later cooling section which were performed sequentially, the earlier cooling section was cooling from 1300 °C to 450 °C, the later cooling section included a first cooling section and a second cooling section which were performed sequentially, the first cooling section was cooling from 450 °C to 280 °C, the first cooling section had an oxygen content of 0.15%, the second cooling section was cooling from 280 °C to 50 °C, the second cooling section had an oxygen content of 0%, and the first cooling section and the second cooling section both had a cooling rate of 0.15 °C/min.

Example 4

This example provides a preparation method for a manganese zinc ferrite, and the preparation method specifically includes the following steps:

i. the 53 mol % of $Fe_2O_3$, 37 mol % of MnO and 10 mol % of ZnO were mixed to obtain a main component, and the main component was mixed with water and subjected to primary wet grinding for 0.5 h, and the main component, balls and water had a mass ratio of 1:7:0.5;

ii. the obtained wet main component was added with a binder (a mass fraction of the binder was 9 wt %) and then subjected to spray granulation and pre-sintering sequentially to obtain a pre-sintered material, and a mass of the binder added was 9.2 wt % of a total mass of the wet main component; during the spray granulation, a material inlet temperature was 338 °C, and a material outlet temperature was 94 °C; the pre-sintering was performed at 910 °C for 4.8 h in a rotary kiln;

iii. the pre-sintered material was added with calcium carbonate, zirconium oxide and cobalt oxide, wherein an addition amount of calcium carbonate was 0.073 wt % of a total mass of the pre-sintered material, an addition amount of zirconium oxide was 0.032 wt % of a total mass of the pre-sintered material, and an addition amount of cobalt oxide was 0.374 wt % of a total mass of the pre-sintered material, the materials were mixed uniformly to obtain an intermediate mixture, the intermediate mixture was mixed with water and subjected to secondary wet grinding for 1.5 h to obtain the wet intermediate mixture, and the intermediate mixture, balls and water had a mass ratio of 1:7:0.5; and iv. the wet intermediate mixture was added with a binder (a mass fraction of the binder was 9 wt %) and then subjected to spray granulation, molding and sintering sequentially to obtain the manganese zinc ferrite, and a mass of the binder added in the wet intermediate mixture was 9.2 wt % of a total mass of the wet intermediate mixture; during the spray granulation, a material inlet temperature was 338 °C, and a material outlet temperature was 94 °C; compression was performed at 8 MPa to prepare a standard ring; the sintering was performed in a bell jar furnace, the sintering included a sintering section and a cooling section which were performed sequentially, the sintering section was performed at 1308 °C, the sintering section had a holding time of 4.8 h, the sintering section had an oxygen content of 5%, the cooling section was divided into an earlier cooling section and a later cooling section which were performed sequentially, the earlier cooling section was cooling from 1308 °C to 450 °C, the later cooling section included a first cooling section and a second cooling section which were performed sequentially, the first cooling section was cooling from 450 °C to 280 °C, the first cooling section had an oxygen content of 0.15%, the second cooling section was cooling from 280 °C to 50 ° C, the second cooling section had an oxygen content of 0%, and the first cooling section and the second cooling section both had a cooling rate of 0.2 °C/min.

Example 5

This example provides a preparation method for a manganese zinc ferrite, and the preparation method specifically includes the following steps:

i. the 53.1 mol % of $Fe_2O_3$, 36.6 mol % of MnO and 10.3 mol % of ZnO were mixed to obtain a main component, and the main component was mixed with water and subjected to primary wet grinding for 0.5 h, and the main component, balls and water had a mass ratio of 1:7:0.6;

ii. the obtained wet main component was added with a binder (a mass fraction of the binder was 9.5 wt %) and then subjected to spray granulation and pre-sintering sequentially to obtain a pre-sintered material, and a mass of the binder added was 9.6 wt % of a total mass of the wet main component; during the spray granulation, a material inlet temperature was 344 °C, and a material outlet temperature was 97 °C; the pre-sintering was performed at 930 °C for 5.4 h in a rotary kiln;

iii. the pre-sintered material was added with calcium carbonate, zirconium oxide and cobalt oxide, wherein an addition amount of calcium carbonate was 0.076 wt % of a total mass of the pre-sintered material, an addition amount of zirconium oxide was 0.036 wt % of a total mass of the pre-sintered material, and an addition amount of cobalt oxide was 0.382 wt % of a total mass of the pre-sintered material, the materials were mixed uniformly to obtain an intermediate mixture, the intermediate mixture was mixed with water and subjected to secondary wet grinding for 1.5 h to obtain the wet intermediate mixture, and the intermediate mixture, balls and water had a mass ratio of 1:7:0.6; and iv. the wet intermediate mixture was added with a binder (a mass fraction of the binder was 9.5 wt %) and then subjected to spray granulation, molding and sintering sequentially to obtain the manganese zinc ferrite, and a mass of the binder added in the wet intermediate mixture was 9.6 wt % of a total mass of the wet intermediate mixture; during the spray granulation, a material inlet temperature was 344 °C, and a material outlet temperature was 97 °C; compression was performed at 9 MPa to prepare a standard ring; the sintering was performed in a bell jar furnace, the sintering included a sintering section and a cooling section which were performed sequentially, the sintering section was performed at 1314 °C, the sintering section had a holding time of 5.4 h, the sintering section had an oxygen content of 5.5%, the cooling section was divided into an earlier cooling section and a later cooling section which were performed sequentially, the earlier cooling section was cooling from 1314 °C to 450 °C, the later cooling section included a first cooling section and a second cooling section which were performed sequentially, the first cooling section was cooling from 450 °C to 280 °C, the first cooling section had an oxygen content of 0.12%, the second cooling section was cooling from 280 °C to 50 °C, the second cooling section had an oxygen content of 0%, and the first cooling section and the second cooling section both had a cooling rate of 0.25 °C/min.

Example 6

This example provides a preparation method for a manganese zinc ferrite, and the preparation method specifically includes the following steps:

i. the 53.15 mol % of $Fe_2O_3$, 36.15 mol % of MnO and 10.7 mol % of ZnO were mixed to obtain a main component, and the main component was mixed with water and subjected to primary wet grinding for 0.5 h, and the main component, balls and water had a mass ratio of 1:8:0.6;

ii. the obtained wet main component was added with a binder (a mass fraction of the binder was 10 wt %) and then subjected to spray granulation and pre-sintering sequentially to obtain a pre-sintered material, and a mass of the binder added was 10 wt % of a total mass of the wet main component; during the spray granulation, a material inlet temperature was 350 °C, and a material outlet temperature was 100 °C; the pre-sintering was performed at 950 °C for 6 h in a rotary kiln;

iii. the pre-sintered material was added with calcium carbonate, zirconium oxide and cobalt oxide, wherein an addition amount of calcium carbonate was 0.08 wt % of a total mass of the pre-sintered material, an addition amount of zirconium oxide was 0.04 wt % of a total mass of the pre-sintered material, and an addition amount of cobalt oxide was 0.39 wt % of a total mass of the pre-sintered material, the materials were mixed uniformly to obtain an intermediate mixture, the intermediate mixture was mixed with water and subjected to secondary wet grinding for 1.5 h to obtain the wet intermediate mixture, and the intermediate mixture, balls and water had a mass ratio of 1:8:0.6; and iv. the wet intermediate mixture was added with a binder (a mass fraction of the binder was 10 wt %) and then subjected to spray granulation, molding and sintering sequentially to obtain the manganese zinc ferrite, and a mass of the binder added in the wet intermediate mixture was 10 wt % of a total mass of the wet intermediate mixture; during the spray granulation, a material inlet temperature was 350 °C, and a material outlet temperature was 100 °C; compression was performed at 10 MPa to prepare a standard ring; the sintering was performed in a bell jar furnace, the sintering included a sintering section and a cooling section which were performed sequentially, the sintering section was performed at 1320 °C, the sintering section had a holding time of 6 h, the sintering section had an oxygen content of 6%, the cooling section was divided into an earlier cooling section and a later cooling section which were performed sequentially, the earlier cooling section was cooling from 1320 °C to 450 °C, the later cooling section included a first cooling section and a second cooling section which were performed sequentially, the first cooling section was cooling from 450 °C to 280 °C, the first cooling section had an oxygen content of 0.11%, the second cooling section was cooling from 280 °C to 50 °C, the second cooling section had an oxygen content of 0%, and the first cooling section and the second cooling section both had a cooling rate of 0.3 °C/min.

Comparative Example 1

This comparative example provides a preparation method for a manganese zinc ferrite, which differs from Example 1 in that the main component in step (1) adopted the following formula: 53.3 mol % of $Fe_2O_3$, 37.6 mol % of MnO and 9.1 mol % of ZnO. Other operation steps and process parameters are identical to those of Example 1.

Comparative Example 2

This comparative example provides a preparation method for a manganese zinc ferrite, which differs from Example 1 in that the main component in step (1) adopted the following formula: 52.8 mol % of $Fe_2O_3$, 36.2 mol % of MnO and 11 mol % of ZnO. Other operation steps and process parameters are identical to those of Example 1.

Comparative Example 3

This comparative example provides a preparation method for a manganese zinc ferrite, which differs from Example 1 in that an addition amount of cobalt oxide in step (3) was 0.5 wt % of a total mass of the pre-sintering material. Other operation steps and process parameters are identical to those of Example 1.

Comparative Example 4

This comparative example provides a preparation method for a manganese zinc ferrite, which differs from Example 1 in that step (4) adopted the following sintering method:

the sintering was performed in a bell jar furnace, the sintering included a sintering section and a cooling section which were performed sequentially, the sintering section was performed at 1290 °C, the sintering section had a holding time of 3 h, the sintering section had an oxygen content of 3%, the cooling section was divided into an earlier cooling section and a later cooling section which were performed sequentially, the earlier cooling section was cooling from 1290 °C to 450 °C, the later cooling section included a first cooling section and a second cooling section which were performed sequentially, the first cooling section was cooling from 450 °C to 280 ° C, the first cooling section had an oxygen content of 0.001%, the second cooling section was cooling from 280 °C to 50 °C, the second cooling section had an oxygen content of 0%, and the first cooling section and the second cooling section both had a cooling rate of 0.05 °C/min.

Except for the above sintering process, the preparation method provided by this comparative example is identical to Example 1.

The manganese zinc ferrites prepared in Examples 1-6 and Comparative Examples 1-4 are tested for the loss over a wide temperature range and Bs at 100 °C. Test conditions of the loss over a wide temperature range are a testing power of 100 kHz and a magnetic flux density of 200 mT. The power loss of the manganese zinc ferrite is tested at 25 °C, 60 °C, 80 °C and 100 °C separately, and the higher the power loss value, the worse the loss over a wide temperature range for the manganese zinc ferrite. Test conditions of Bs are a testing power of 50 Hz and a magnetic field intensity of 1194 m/A. The test results are shown in Table 1.

TABLE 1

| | Power loss [kW/m$^3$] | | | | Bs [mT] |
|---|---|---|---|---|---|
| | 25° C. | 60° C. | 80° C. | 100° C. | 100° C. |
| Example 1 | 223 | 225 | 241 | 285 | 435 |
| Example 2 | 220 | 226 | 245 | 283 | 432 |
| Example 3 | 222 | 224 | 241 | 286 | 436 |
| Example 4 | 225 | 226 | 241 | 283 | 433 |
| Example 5 | 222 | 226 | 242 | 284 | 435 |
| Example 6 | 226 | 225 | 246 | 288 | 437 |
| Comparative Example 1 | 280 | 300 | 330 | 350 | 440 |
| Comparative Example 2 | 300 | 310 | 330 | 365 | 420 |
| Comparative Example 3 | 280 | 310 | 345 | 355 | 428 |
| Comparative Example 4 | 260 | 285 | 315 | 345 | 430 |

It can be seen from the test data in Table 1 that the $Fe_2O_3$ content in Comparative Example 1 is too high compared with Example 1, resulting in high power loss and poor loss over a wide temperature range of the manganese zinc ferrite. The ZnO content in Comparative Example 2 is too high compared with Example 1, resulting in high power loss of the manganese zinc ferrite as well as low Bs of the manganese zinc ferrite. The $Co_2O_3$ content in Comparative Example 3 is too high compared with Example 1, resulting in high power loss of the manganese zinc ferrite as well as low Bs of the manganese zinc ferrite. The oxygen content in Comparative Example 4 is relatively low compared with Example 1, resulting in high power loss and poor loss over a wide temperature range of the manganese zinc ferrite.

The applicant declares that although the specific embodiments of the present application are described above, the protection scope of the present application is not limited thereto, and the protection scope of the present application is defined by the claims.

What is claimed is:

1. A manganese zinc ferrite comprising a main component and an auxiliary component, wherein the main component comprises iron oxide, zinc oxide and manganese monoxide; based on a total amount of the main component being 100 mol %, a content of iron oxide is 52.75-53.15 mol %, a content of zinc oxide is 9.1-10.7 mol % and a remainder is manganese monoxide; wherein the auxiliary component consists of cobalt oxide, calcium carbonate and zirconium oxide; wherein a preparation method for the manganese zinc ferrite comprises:

(I) mixing iron oxide, zinc oxide and manganese monoxide at a ratio to obtain the main component to form an oxide mixture, mixing the oxide mixture with water and then performing primary wet grinding, adding a binder into the obtained wet main component and then performing granulation and pre-sintering sequentially to obtain a pre-sintered material; and (II) mixing the pre-sintered material with the auxiliary component to obtain an intermediate mixture, mixing the intermediate mixture with water and performing secondary wet grinding, adding a binder into the obtained wet intermediate mixture and then performing granulation, molding and sintering sequentially to obtain the manganese zinc ferrite;

wherein a content of calcium carbonate added into the pre-sintered material is 0.06-0.08 wt % of a total mass of the pre-sintered material, a content of zirconium oxide added into the pre-sintered material is 0.02-0.04 wt % of the total mass of the pre-sintered material, and a content of cobalt oxide added into the pre-sintered material is 0.35-0.39 wt % of the total mass of the pre-sintered material;

wherein under test conditions at a test frequency of 100 kHz and a magnetic flux density of 200 mT, the manganese zinc ferrite has a loss of less than 230 $kW/m^3$ in a 25 °C environment;

optionally, under test conditions at a test frequency of 100 kHz and a magnetic flux density of 200 mT, the manganese zinc ferrite has a loss of less than 230 $kW/m^3$ in a 60 °C environment;

optionally, under test conditions at a test frequency of 100 kHz and a magnetic flux density of 200 mT, the manganese zinc ferrite has a loss of less than 250 $kW/m^3$ in a 80 °C environment;

optionally, under test conditions at a test frequency of 100 kHz and a magnetic flux density of 200 mT, the manganese zinc ferrite has a loss of less than 290 $kW/m^3$ at 100 °C;

optionally, under test conditions at a test frequency of 50 Hz and a magnetic field intensity of 1194 A/m, the ferrite has a saturation magnetic flux density of more than 430 mT in a 100 °C environment.

2. A preparation method for the manganese zinc ferrite according to claim 1, wherein the preparation method comprises:

(I) mixing iron oxide, zinc oxide and manganese monoxide at a ratio to obtain the main component to form an oxide mixture, mixing the oxide mixture with water and then performing primary wet grinding, adding a binder into the obtained wet main component and then performing granulation and pre-sintering sequentially to obtain a pre-sintered material, wherein the main component comprises iron oxide, zinc oxide and manganese monoxide; based on a total amount of the main component being 100 mol %, a content of iron oxide is 52.75-53.15 mol %, a content of zinc oxide is 9.1-10.7 mol % and a remainder is manganese monoxide; and (II) mixing the pre-sintered material with the auxiliary component to obtain an intermediate mixture, mixing the intermediate mixture with water and performing secondary wet grinding, adding a binder into the obtained wet intermediate mixture and then performing granulation, molding and sintering sequentially to obtain the manganese zinc ferrite, wherein the auxiliary component consists of cobalt oxide, calcium carbonate and zirconium oxide, a content of calcium carbonate added into the pre-sintered material is 0.06-0.08 wt % of a total mass of the pre-sintered material, a content of zirconium oxide added into the pre-sintered material is 0.02-0.04 wt % of the total mass of the pre-sintered material, and a content of cobalt oxide added into the pre-sintered material is 0.35-0.39 wt % of the total mass of the pre-sintered material.

3. The preparation method according to claim 2, wherein the primary wet grinding is ball milling;

optionally, during the primary wet grinding, the main component, balls and water have a mass ratio of 1:(5-8):(0.4-0.6);

optionally, a mass of the binder added into the wet main component is 8-10 wt % of a total mass of the wet main component.

4. The preparation method according to claim 2, wherein in step (I), the granulation is spray granulation;

optionally, during the spray granulation, a material inlet temperature is 320-350 °C;

optionally, during the spray granulation, a material outlet temperature is 85-100 °C;

optionally, the pre-sintering is performed in a rotary kiln;

optionally, the pre-sintering is performed at 850-950 °C;

optionally, the pre-sintering is performed for 3-6 h.

5. The preparation method according to claim 2, wherein the secondary wet grinding is ball milling;

optionally, during the secondary wet grinding, the intermediate mixture, balls and water have a mass ratio of 1:(5-8):(0.4-0.6);

optionally, a mass of the binder added into the wet intermediate mixture is 8-10 wt % of a total mass of the wet intermediate mixture.

6. The preparation method according to claim 2, wherein in step (II), the granulation is spray granulation;

optionally, during the spray granulation, a material inlet temperature is 320-350 °C;

optionally, during the spray granulation, a material outlet temperature is 85-100 °C;

optionally, the molding comprises performing compression at 5-10 MPa to prepare a standard ring;

optionally, the sintering is performed in a bell jar furnace;

optionally, the sintering comprises a sintering section and a cooling section which are performed sequentially;

optionally, the sintering section is performed at 1290-1320 °C;

optionally, the sintering section has a holding time of 3-6 h;

optionally, the sintering section has an oxygen content of 3-6%;

optionally, the cooling section is divided into an earlier cooling section and a later cooling section which are performed sequentially, and the later cooling section comprises a first cooling section and a second cooling section which are performed sequentially;

optionally, the earlier cooling section comprises cooling from an end temperature of the sintering section to an initial temperature of the first cooling section;

optionally, the first cooling section is cooling from 450 °C to 280 °C;

optionally, the second cooling section is cooling from 280 °C to 50 °C;

optionally, the first cooling section has an oxygen content of 0.02-0.15%;

optionally, the second cooling section has an oxygen content of 0%;

optionally, the later cooling section has a cooling rate of 0.05-0.3 °C/min.

* * * * *